United States Patent
Ogawa (10) Patent No.: US 9,843,516 B2
(45) Date of Patent: Dec. 12, 2017

(54) COMMUNICATION NODE, CONTROL APPARATUS, METHOD FOR MANAGEMENT OF CONTROL INFORMATION ENTRIES AND PROGRAM

(71) Applicant: NEC Corporation, Minato-ku, Tokyo (JP)

(72) Inventor: Hideki Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 176 days.

(21) Appl. No.: 14/652,633

(22) PCT Filed: Dec. 18, 2013

(86) PCT No.: PCT/JP2013/083860
§ 371 (c)(1),
(2) Date: Jun. 16, 2015

(87) PCT Pub. No.: WO2014/098117
PCT Pub. Date: Jun. 26, 2014

(65) Prior Publication Data
US 2015/0341266 A1    Nov. 26, 2015

(30) Foreign Application Priority Data
Dec. 19, 2012    (JP) .................................. 2012-276919

(51) Int. Cl.
*H04L 12/741*    (2013.01)
*H04L 12/931*    (2013.01)
(Continued)

(52) U.S. Cl.
CPC ........ *H04L 45/745* (2013.01); *H04L 12/2876* (2013.01); *H04L 12/4641* (2013.01);
(Continued)

(58) Field of Classification Search
CPC . H04L 45/745; H04L 12/6418; H04L 49/354; H04L 47/808; H04L 12/2876; H04L 12/4641
See application file for complete search history.

(56) References Cited

U.S. PATENT DOCUMENTS 6,292,483 B1 * 9/2001 Kerstein ............. G06F 13/1605
                                                    370/389
6,711,165 B1 * 3/2004 Tzeng ................. H04L 47/2425
                                                    370/392
(Continued)

FOREIGN PATENT DOCUMENTS

CN    102263664 A    11/2011
CN    102769565 A    11/2012
(Continued)

OTHER PUBLICATIONS

Nick McKeown et al., "OpenFlow: Enabling Innovation in Campus Networks", online, Mar. 14, 2008.
(Continued)

*Primary Examiner* — Mounir Moutaouakil (57) ABSTRACT

The communication node includes an entry memory adapted to store a preset number of the control information entries, each stipulating the processing applied to a packet received, in association with the user information, and a packet processor that references the entry memory to process the packet received. The communication node also includes an entry management section that exercises control so that, on the basis of a preset reference, the proportion of the number of the control information entries for one user stored in the entry memory to the number of the control information entries storable in the entry memory will not surpass a preset value.

16 Claims, 9 Drawing Sheets

(51) Int. Cl.
*H04L 12/927* (2013.01)
*H04L 12/46* (2006.01)
*H04L 12/28* (2006.01)
*H04L 12/64* (2006.01)

(52) U.S. Cl.
CPC ........ *H04L 12/6418* (2013.01); *H04L 47/808* (2013.01); *H04L 49/354* (2013.01)

(56) References Cited

U.S. PATENT DOCUMENTS

| | | | |
|---|---|---|---|
| 7,673,056 B1* | 3/2010 | Inbaraj | H04L 67/16 709/217 |
| 9,398,172 B2* | 7/2016 | Mohammed | H04W 24/08 |
| 2007/0237153 A1 | 10/2007 | Slaughter et al. | |
| 2012/0020220 A1* | 1/2012 | Sugita | H04L 63/02 370/235 |
| 2012/0020361 A1 | 1/2012 | Ueno | |
| 2012/0054079 A1 | 3/2012 | Hayashi | |
| 2012/0075991 A1 | 3/2012 | Sugita et al. | |
| 2012/0233349 A1 | 9/2012 | Aybay | |

FOREIGN PATENT DOCUMENTS

| | | | |
|---|---|---|---|
| EP | 2139176 A1 | | 12/2009 |
| JP | 2007-226706 A | | 9/2007 |
| JP | 2012-151689 A | | 8/2012 |
| WO | 2009/042919 A2 | | 4/2009 |
| WO | 2011/040511 A1 | | 4/2011 |
| WO | WO2011081020 | * | 6/2011 |
| WO | WO2011074516 | * | 7/2011 |
| WO | 2012/029409 A1 | | 3/2012 |
| WO | 2012/144190 A1 | | 10/2012 |

OTHER PUBLICATIONS

"OpenFlow Switch Specification", Version 1.1.0 Implemented (Wire Protocol OxO2), online, Feb. 28, 2011.
International Search Report for PCT Application No. PCT/JP2013/083860, dated Mar. 25, 2014.
Extended European Search Report for EP Application No. EP13866409.9 dated May 20, 2016.
Chinese Office Action for CN Application No. 201380066926.4 dated Apr. 6, 2017 with English Translation.
Japanese Office Action for JP Application No. 2014-553174 dated on Oct. 10, 2017 with English Translation.

* cited by examiner

| VLAN ID | COST BEARING RATIO |
|---|---|
| α | 41% |
| β | 59% |

COMMUNICATION NODE, CONTROL APPARATUS, METHOD FOR MANAGEMENT OF CONTROL INFORMATION ENTRIES AND PROGRAM

CROSS-REFERENCE TO RELATED APPLICATION

This application is a National Stage Entry of PCT/JP2013/083860 filed on Dec. 18, 2013, which claims priority from Japanese Patent Application 2012-276919 filed on Dec. 19, 2012, the contents of all of which are incorporated herein by reference, in their entirety.

TECHNICAL FIELD

This invention relates to a communication node, a control apparatus, a method for management of control information entries, and a program. In particular, it relates to a communication node, a control apparatus, a method for management of control information entries, and a program, according to which a packet received is processed by referencing an entry as set from the control apparatus.

BACKGROUND

Recently, a technique known as OpenFlow has been proposed, see Non-Patent Literatures 1, 2. The OpenFlow comprehends communication as an end-to-end flow and manages path control, recovery from malfunctions, load balancing and optimization from one flow to another. An OpenFlow switch, specified in Non-Patent Literature 2, includes a secure channel over which to communicate with an OpenFlow Controller, and operates in accordance with a flow table an addition to or a rewriting in which is instructed as necessary from the OpenFlow Controller. In the flow table, a set of match conditions (Match Fields) for matching against a packet header, the flow statistics information (Counters) and a set of instructions that define the processing contents (Instructions) are defined from one flow to another. See '4.1 Flow Table' of Non-Patent Literature 2.

On reception of a packet, the OpenFlow switch searches the flow table for an entry having the match condition conforming to the header information of the received packet. See '4.4 Matching' of Non-Patent Literature 2. If, as a result of the search, the entry matching the received packet is found, the OpenFlow switch updates the flow statistics information (Counters), at the same time as it executes processing contents stated in the instruction field of the matching entry, such as transmission at a specified port, flooding or dropping. If conversely no entry matching the received packet is found, the OpenFlow switch sends an entry setting request, that is, a request for having the control information sent to it in order to process the received packet (Packet-In message), to the OpenFlow Controller over the secure channel. The OpenFlow switch receives the flow entry, in which processing contents are stated, and accordingly updates its flow table. In this manner, the OpenFlow switch forwards the packet, using the entry stored in the flow table as the control information.

In Non-Patent Literature 1, there is disclosed a method for leasing a redundant path that is not in use in an optical network system. Specifically, a setting controller of the optical network system recruits candidate users and decides the amounts of lease fees or the amount of the resources leased in dependence upon the number of the candidate users.

PATENT LITERATURE

Patent Literature 1: JP2007-226706A

NON-PATENT LITERATURES

Non-Patent Literature 1: Nick McKeown and seven others: "Open Flow: Enabling Innovation in Campus Networks", [online], [searched on November 24 Heisei24 (2012)], Internet <URL:http://www.openflow.org/documents/openflow-wp-latest.pdf>

Non-Patent Literature 2: "Open Flow Switch Specification", Version 1.1.0 Implemented (Wire Protocol OxO2), [online], [searched on November 24 Heisei24 (2012)], Internet URL:https://www.opennetworking.org/images/stories/downloads/specification/openflow-spec-v1.2.pdf

SUMMARY

Technical Problem

The following analysis is by the present invention. The number of flow entries which can be stored in one of the communication nodes, in this case, the OpenFlow switches, located in a centralized control network, represented by the above mentioned OpenFlow, is finite. Hence, such a scheme that removes the flow entries that have fallen out of use has been devised. According to the OpenFlow specification of the Non-Patent Literature 2, for example, such a method may be used in which, if a packet matching the match conditions of a flow entry has not been received for a certain time duration, the flow entry is removed (idle timeout), or in which, if a preset time has elapsed as from the time of setting a flow entry, the flow entry is removed (hard timeout). Such a method may also be used in which, if an upper limit of the number of flow entries that can be stored in one communication node has been reached, one or more of the flow entries, as selected by a rule for selection, such as LRU (Least Recently Used) or FIFO (First-In First-Out), is removed.

Figure 9:
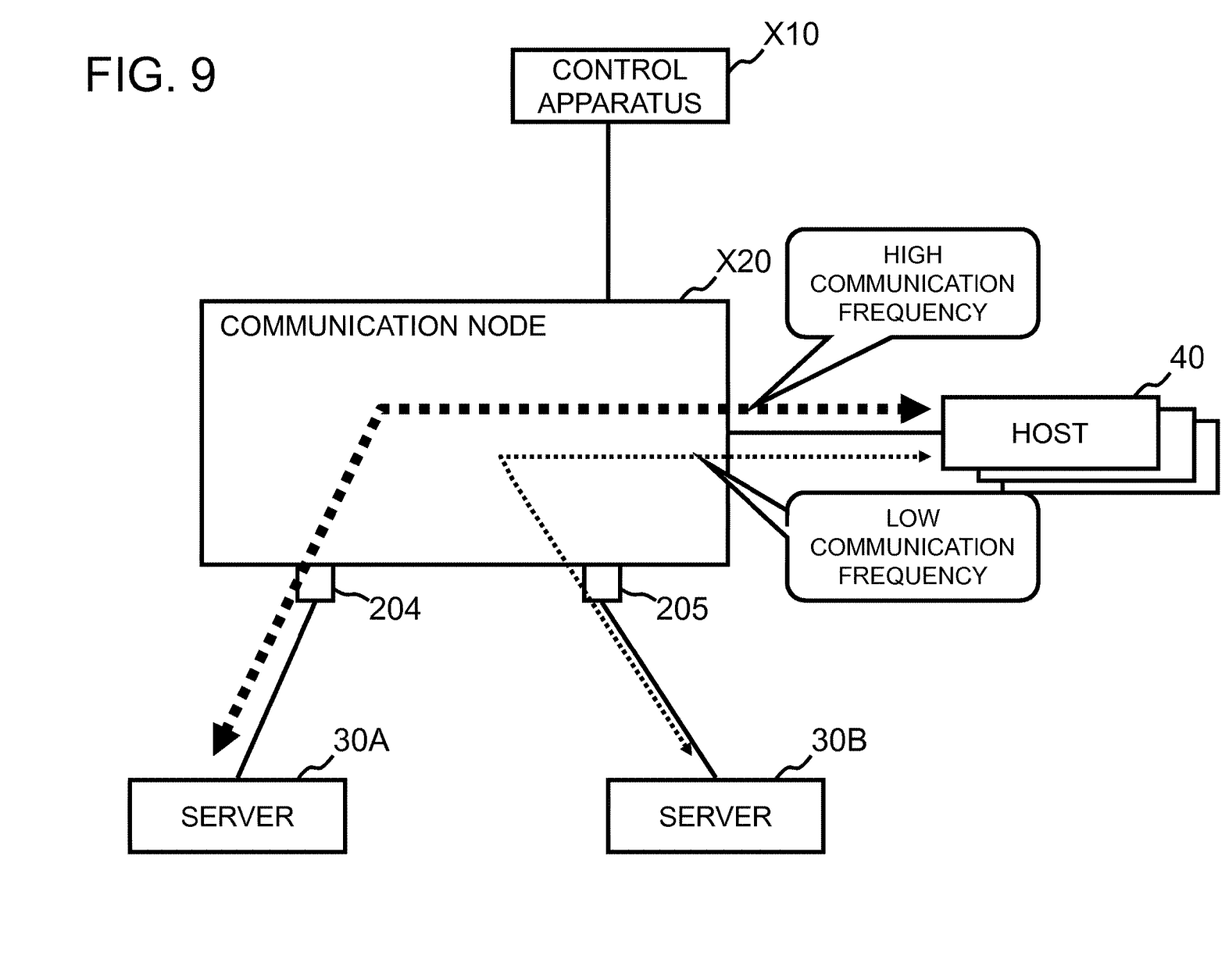
FIG. 9 is a schematic view for illustrating the relationship between the server-host communication and the flow entries.

Such a configuration in which a plurality of servers, which may also be virtual machines, are connected to a network to render services to one or more hosts, as shown in FIG. 9, is now scrutinized. If a communication path from one of the servers to one of the hosts overlaps with that from another server to another host, the flow entries that realize communication between the servers and the hosts are set in the communication node(s) situated in an overlapping path section. It is now supposed that, in the above configuration, an application is in operation in which communication from one of the multiple servers, for example a server 30A of FIG. 9, to a host, occurs more frequently than that from another server, for example a server 30B of FIG. 9, to another host. In this case, a greater part of the storage space for the flow entries of the communication nodes in the overlapping path section is taken up by the flow entries used for realizing the server-host communication occurring more frequently. There is thus a possibility that, on occurrence of a communication of lesser frequency between a server and a host, the flow entry or entries needed for the communication of the lesser frequency has already been removed, or that, if a new flow entry is to be set, the storage space is short for setting the new flow entry. Ultimately, there is caused a difference between the values of the mean TAT (Turnaround Time) of the two servers.

It is therefore an object of the present invention to provide a communication node, a control apparatus, a method for controlling the communication node, and a program, according to which it is possible to prevent the control information entries stored in a communication node of a centralized control network from becoming biased to those of some particular communication.

Solution

In a first aspect, there is provided a communication node comprising an entry memory adapted to store a preset number of control information entries, each stipulating the processing applied to a packet received, in association with the user information, a packet processor that references the entry memory to process the packet received, and an entry management section that exercises control so that, on the basis of a preset reference, the number of the control information entries for one user, stored in the entry memory, will not be such a one that a preset proportion thereof to the number of the control information entries storable in the entry memory is surpassed.

In a second aspect, there is provided a control apparatus comprising an entry setting section that sets a control information entry or entries, stipulating the processing to be applied to a packet received, in response to a request from a communication node adapted to store a preset number of the control information entries, an entry management section that manages the control information entry or entries as set from user to user, and a control section that controls the entry setting section so that, on the basis of a preset reference, the number of the control information entries for one user, stored in an entry memory of the communication node, will not be such a one that a preset proportion thereof to the number of the control information entries storable in the entry memory is surpassed.

In a third aspect, there is provided a method for management of a control information entry or entries comprising checking to see whether or not the proportion of the number of the control information entries for one user to the number of the control information entries stored in an entry memory of a communication node surpasses a preset value, and removing the entry or entries of the one user from the entry memory in case the proportion surpasses the preset value. The present method is bound up with a particular machine (a communication node or a control apparatus) which is an entity for management of control information entries stored in the entry memory of the communication node.

In a fourth aspect, there is provided a program that implements the functions of the above mentioned communication node or the control apparatus. It is noted that the present program can be recorded on a computer-readable (non-transient) recording medium. That is, the present invention can be implemented as a computer program product.

The meritorious effects of the present invention are summarized as follows. According to the present invention, it is possible to prevent the control information entries held by the communication node from becoming biased to those of some particular communication.

PREFERRED MODES

Initially, a summary of a preferred mode of the present invention will be described with reference to the drawings. It is noted that symbols are entered in the following summary merely as examples to assist in understanding and are not intended to limit the present invention to the mode illustrated.

In a preferred mode, the present invention may be implemented by a communication node comprising an entry memory (201 of FIG. 1) adapted to store a preset number of control information entries, each stipulating the processing applied to a packet received, in association with the user information, a packet processor (202 of FIG. 1) that references the entry memory (201 of FIG. 1) to process the packet received, and an entry management section (203 of FIG. 1) that exercises control so that, on the basis of a preset reference, the number of the control information entries for one user, stored in the entry memory (201 of FIG. 1), will not be such a one that a preset proportion thereof to the number of the control information entries storable in the entry memory is surpassed. The user information may be the information concerning a party or parties involved in communication, such as a provider of services exploiting a server or exploiting a virtual machine running on a network, or users in general benefiting from the services By the above configuration, it is possible to avoid the flow entries for a particular user from increasing limitlessly.

Exemplary Embodiment 1

Figure 1:
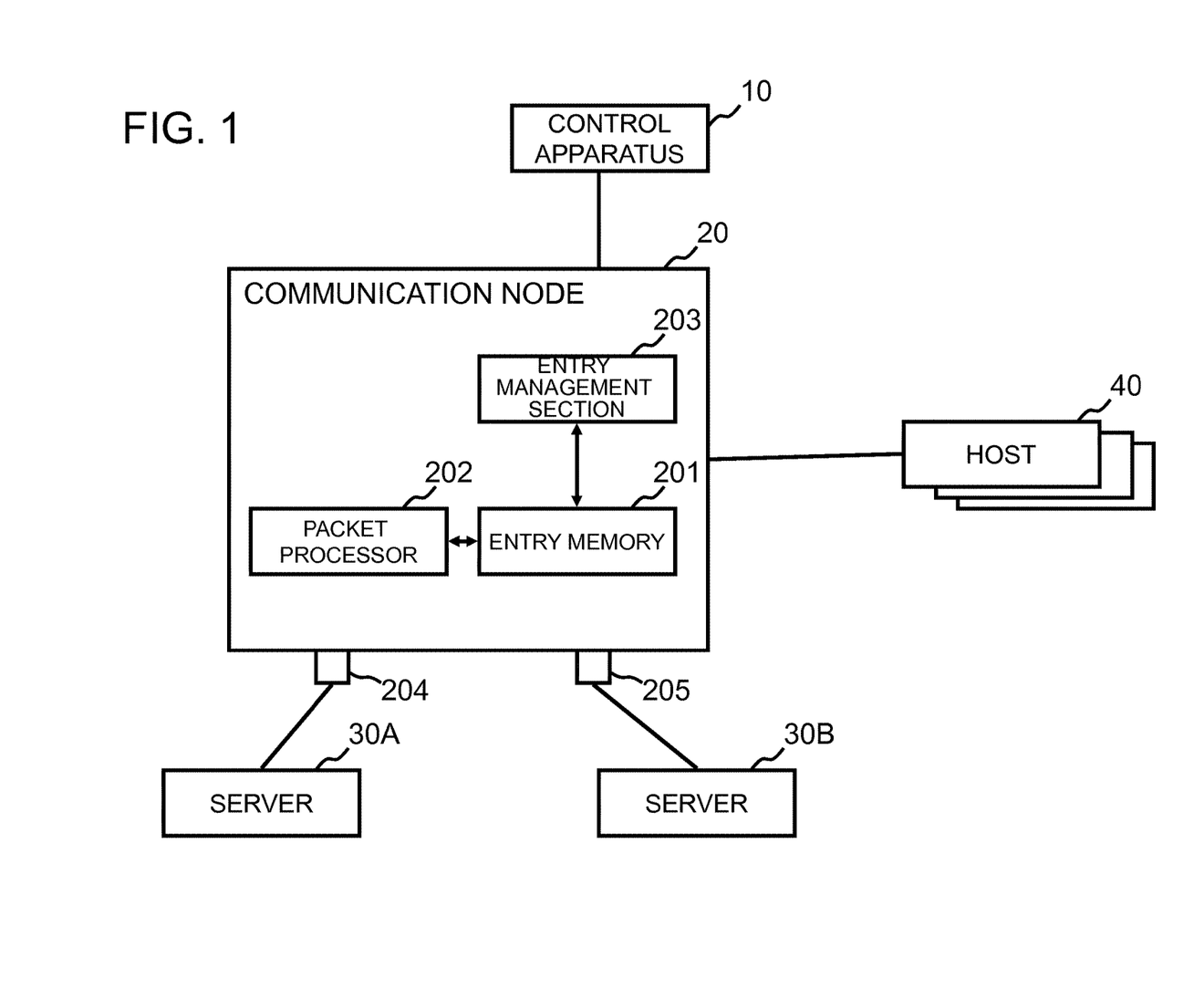
FIG. 1 is a block diagram showing a configuration of an exemplary embodiment 1 according to the present invention.

An exemplary embodiment 1 of the present invention will now be described in detail with reference to the drawings. FIG. 1 depicts a configuration of the exemplary embodiment 1 of the present invention. In FIG. 1, there is shown a configuration including a control apparatus 10, a communication node 20, servers 30A, 30B and a host 40 communicating with the servers over the communication node 20.

The control apparatus 10 controls the communication node 20 by setting a flow entry in an entry memory 201 of the communication node 20. As the control apparatus 10, an OpenFlow controller shown in Non-Patent Literatures 1, 2 or a product called an SDN (Software Defined Network) controller may be used.

The communication node 20 includes a packet processor 202 and an entry management section 203, in addition to the entry memory 201 configured for storing the flow entry as set by the control apparatus 10. The packet processor searches the entry memory 201 for an entry having match conditions matching a received packet, and processes the packet in accordance with the flow entry thus found out. The entry management section manages the entries stored in the entry memory 201.

Figure 2:
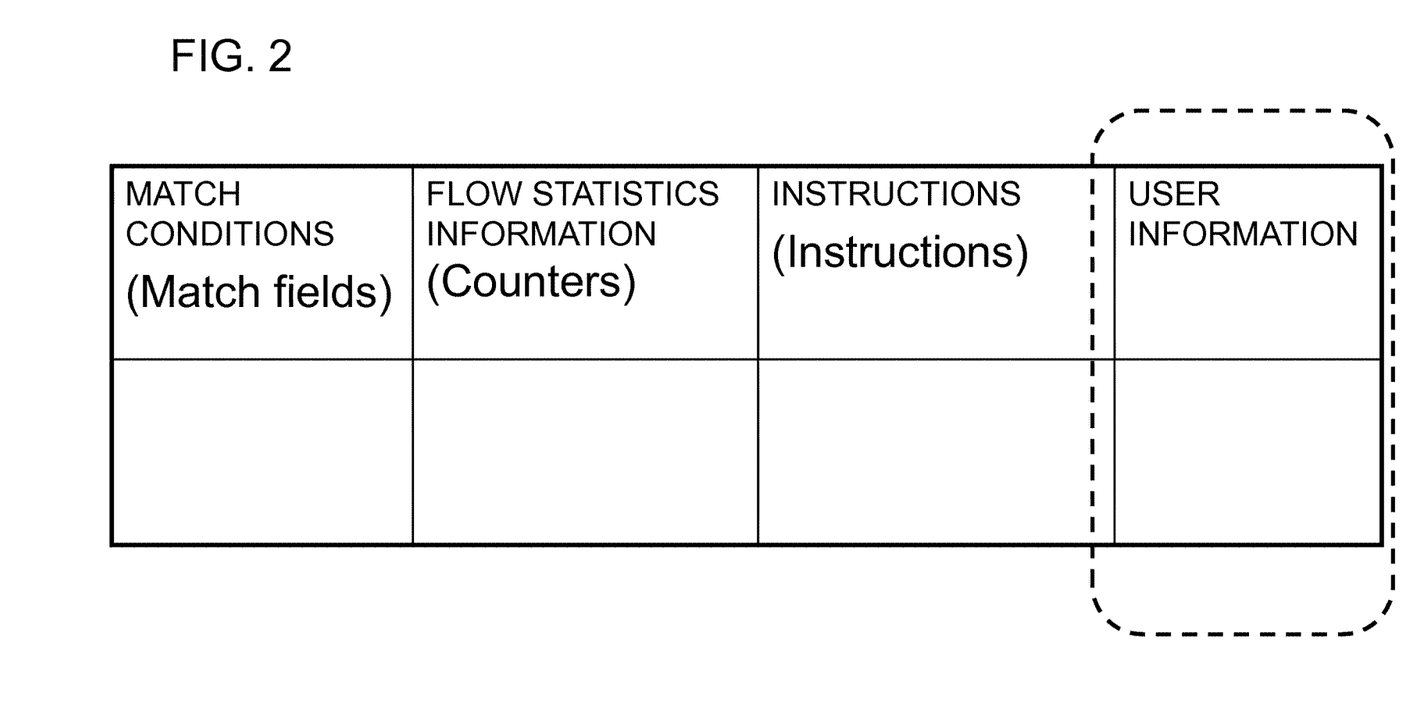
FIG. 2 is a tabulated view showing a configuration of a flow entry stored in a communication node of the exemplary embodiment 1 of the present invention.

FIG. 2 shows a configuration of a flow entry stored in the entry memory 201 of the communication node 20. Referring to FIG. 2, the flow entry is made up by a set of match conditions, flow statistics information, a set of instructions and the user information, correlated one with another. The match conditions match against an input port as well as the header information of the received packet, and the flow statistics information records the statistic information concerning e.g., the packets matching the match conditions. The instructions denote the processing applied to a packet matching the match conditions, and the user information refers to users of the packets matching the match conditions. The flow entry shown in FIG. 2 may be constructed by a flow entry stated in '5.2 Flow Table' of Non-Patent Literature 2 and a user information field appended thereto.

In case one and the same network is shared by multiple users, it is a commonplace management practice to appropriate different VLAN (Virtual Local Area Network) IDs from one user to another. Thus, in the subject exemplary embodiment, the VLAN ID is used as the user information. However, the user information is not restricted to the VLAN ID and, as the user information, the more precisely defined information, such as the information showing an administrator of a source or destination entity for the packet, may also be used.

In the following description of the subject exemplary embodiment, a user A (tenant A) rents a server 30A, and another user B (tenant B) rents a server 30B. To share the same network by multiple users, the VLAN ID appropriated to the user A is labeled 'α' and that appropriated to the user B is labeled 'β'.

The communication node 20 includes ports 204, 205 in each of which the VLAN ID can be set. It is assumed that, in the subject exemplary embodiment, the VLAN ID 'α' is set for the port 204 of the communication node 20 connecting to the server 30A, and the VLAN ID 'β' is set for the port 205 of the communication node 20 connecting to the server 30B. The VLAN IDs, set on these ports, are used when recording the VLAN IDs in the user information fields in the entry memory 201.

On receipt of a packet, the packet processor 202 searches the entry memory 201 for a flow entry having the match conditions matching the received packet. If, as a result of the search, the flow entry having the match conditions matching the received packet is found, the packet processor 202 applies processing contents specified in the instruction field of the flow entry, thus found, to the packet received. These processing contents may include forwarding the packet out a specified port, header rewrite and so on. The packet processor 202 also updates the flow statistics information field of the flow entry, while recording the VLAN ID, as set on the packet input port, in the user information field of the flow entry.

If, as a result of the search in the entry memory 201, no flow entry matching the received packet has been found, the packet processor 202 sends the received packet or the information extracted therefrom to the control apparatus 10 to request the control apparatus to set a flow entry.

There may be cases wherein, when the packet processor 202 requests the control apparatus 10 to set the flow entry, the entry memory 201 is full, there being no vacant space therein for storage. In such case, the packet processor requests the entry management section 203 to remove an entry as the packet processor specifies a VLAN ID as set at the packet input port.

On receipt of the request for entry removal from the packet processor 202, the entry management section 203 checks to see whether or not the proportion of the number of the flow entries bearing the VLAN ID of the user in question to the total number of the flow entries that can be stored by the entry memory 201, that is, a use ratio, as later explained, has exceeded a cost bearing ratio (threshold value) as set for the user (VLAN ID), as later explained. This check is made on the basis of the user information of the flow entries stored in the entry memory 201. If, as a result of the search, the proportion of flow entries of the user in question (use ratio) has exceeded the user's cost bearing ratio (threshold value), the entry management section 203 removes the flow entry as selected using a suitable algorithm, such as LRU (Least Recent Used), from among the flow entries mapped to the user information. This creates a vacant storage space in the entry memory 201.

If the result of the above search indicates that the proportion of the flow entries of the user in question (use ratio) does not exceed his/her cost bearing ratio (threshold value), as set from user to user, the entry management section 203 selects a flow entry from among the flow entries mapped to the user information of users other than the user in question, with the aid of the suitable algorithm, such as LRU, to remove the so selected flow entry. This creates a vacant storage space in the entry memory 201.

Figure 3:
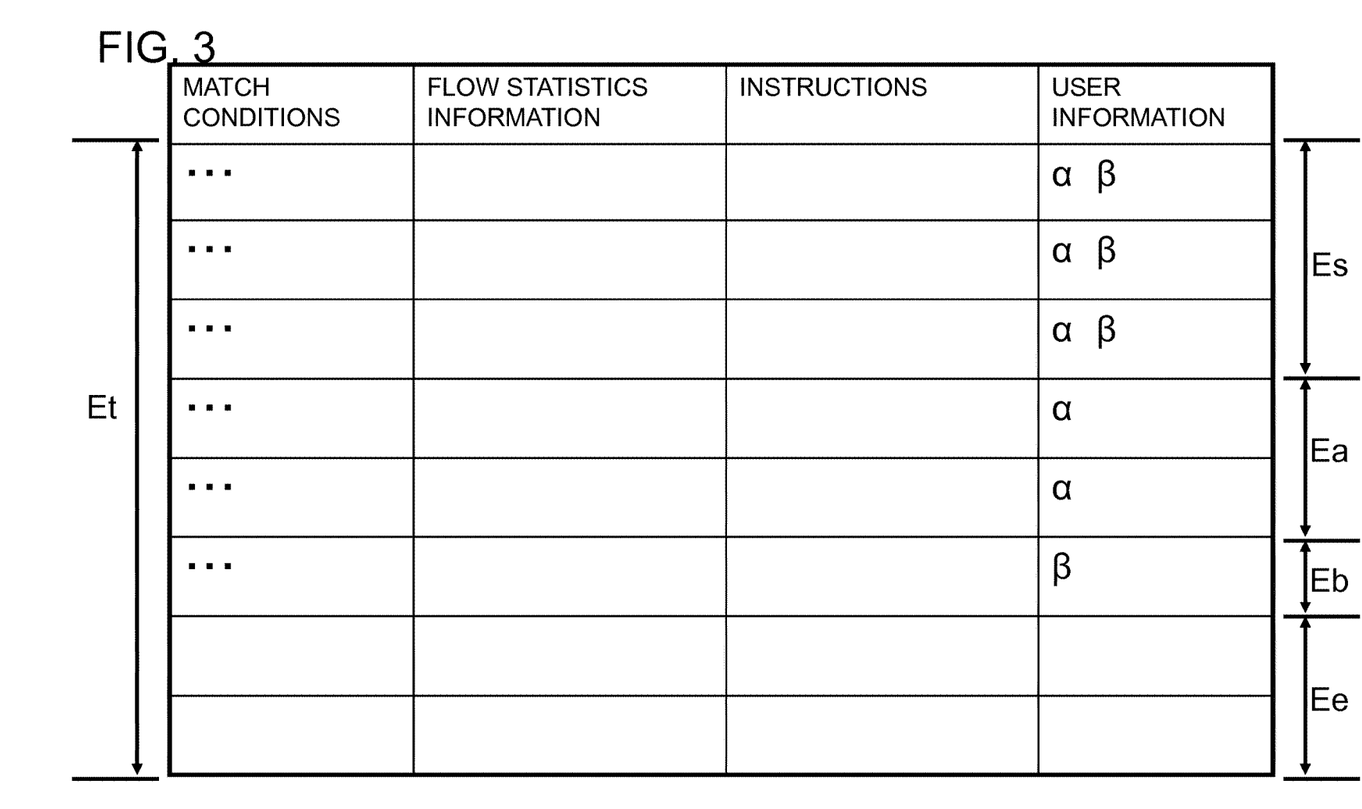
FIG. 3 is a tabulated view for illustrating an entry use ratio of the exemplary embodiment 1 of the present invention.

The above mentioned proportion of the flow entries (use ratio) and the cost bearing ratio (threshold value) of the user in question will now be explained. FIG. 3 shows a set of flow entries stored at a certain time point in the entry memory 201. The flow entry, in the user information field of which is recorded 'α', is the flow entry for the user A who rents the server 30A. Likewise, the flow entry, in the user information field of which is recorded 'β', is the flow entry for the user B who rents the server 30B. The flow entry, in the user information field of which is recorded 'αβ', is the flow entry that ever matched both the packet coming via port 204 and the packet coming via port 205, and may be said to be the flow entry shared by both the users A and B.

Referring to FIG. 3, Et denotes the total number of the flow entries that can be stored in the entry memory 201, and Es the number of the flow entries shared by the users A and B. Ea denotes the number of the flow entries used solely by the user A and Eb the number of the flow entries used solely by the user B. Ee denotes the number of flow entries that can be stored in a storage space not used at present (vacant storage space).

In the subject exemplary embodiment, use measures Ma, Mb of flow entries of the respective users are calculated, using the above mentioned numerical values. Ma denotes the use measure of the flow entries of the user A and Mb that of the flow entries of the user B. For example, it is supposed that 400 flow entries can be stored and there has been no vacant storage space (Et=400, Ee=0). If, in such case, there are 200 flow entries, each with a recording of the VLAN ID of the user A (Es=100, Ea=100), Ma is calculated to be 0.5. Likewise, if there are 300 flow entries, each with a recording of the VLAN ID of the user B (Es=100, Eb=200), Mb is calculated to be 0.75.

That is, $$Ma=(Es+Ea)/(Et-Ee), \text{ and}$$

$$Mb=(Es+Eb)/(Et-Ee).$$

The values of the user-based flow entry use ratio may be expressed by $$Ua=Ma/(Ma+Mb) \text{ and}$$

$$Ub=Mb/(Ma+Mb)$$

for the users A and B, respectively, where the flow entry use ratio for the user A is denoted as Ua and that for the user B as Ub.

For example, if Ma=0.5 and Mb=0.75, the user A's flow entry use ratio Ua is calculated to be 0.4=40%. Likewise, the user B's flow entry use ratio Ub is calculated to be 0.6=60%.

Figure 4:
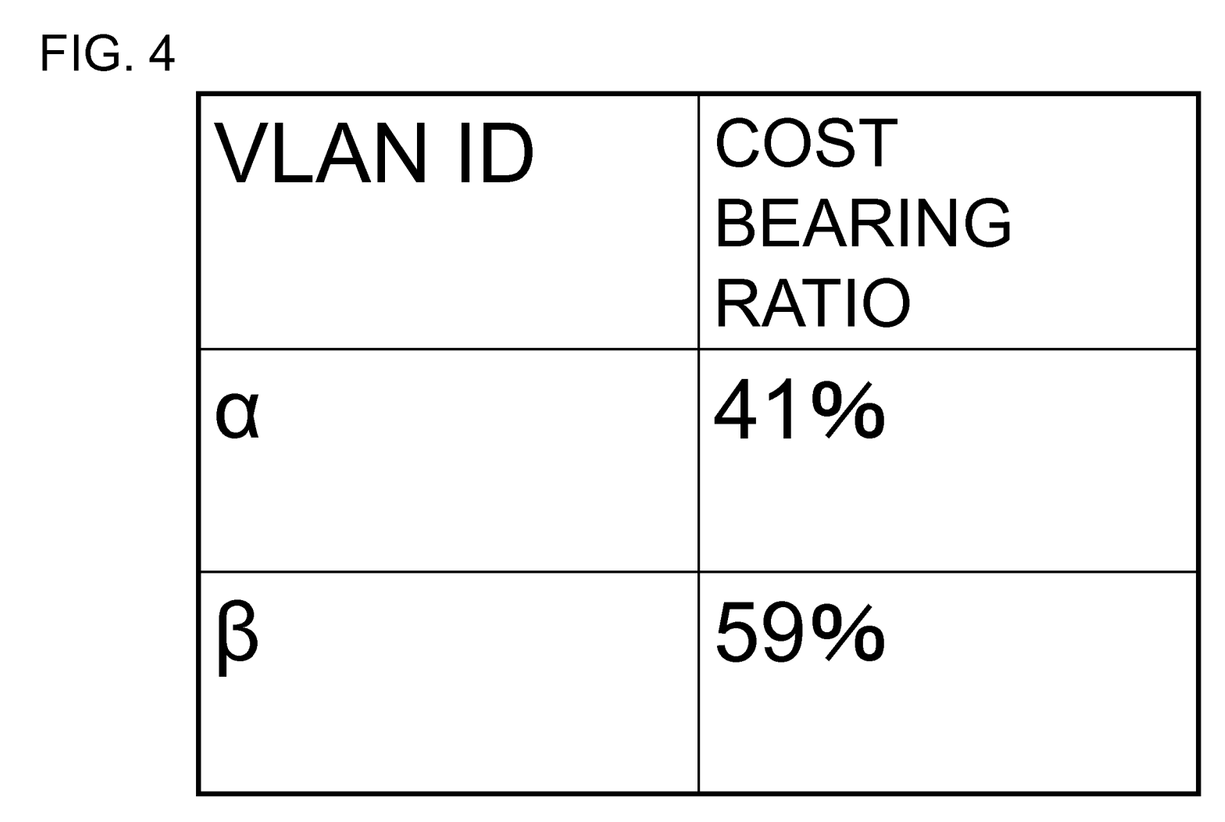
FIG. 4 is a tabulated view for illustrating an example entry appropriation ratio as set in an entry management section of the communication node of the exemplary embodiment 1 of the present invention.

FIG. 4 depicts example values of the cost bearing ratio (threshold value) set from user to user. These are set in e.g., the entry management section 203 by e.g., a network administrator. If, in the example case, shown in FIG. 4, there is no vacant space for storage of a new flow entry, and the flow entry use ratio Ua of the user A exceeds 41%, the user A's own flow entry is subject to removal. Likewise, if the flow entry use ratio Ub of the user B exceeds 59%, the user B's own flow entry is subject to removal. In the above case, the user A's flow entry use ratio Ua is 40%, so that, if there is no vacant space for storage of a new flow entry, not the user A's flow entry but the user B's flow entry is subject to removal. On the other hand, the user B's flow entry use ratio Ub is 60%, so that, if there is no vacant storage space in which to store a new flow entry, the user B's flow entry is subject to removal. As a result, the flow entry use ratio Ub decreases at the time of next decision.

In the subject exemplary embodiment, the above mentioned cost bearing ratio (threshold value) is calculated on the basis of the amount borne by each user in renting the network infrastructure. If, for example, the amount paid by the user A is Ca and that paid by the user B is Cb, the user A's cost bearing ratio (threshold value) Pa and the user B's cost bearing ratio (threshold value) Pb may respectively be found by $$Pa=Ca/(Ca+Cb) \text{ and}$$

$$Pb=Cb/(Ca+Cb).$$

By so doing, an upper limit of the number of flow entries can be set depending on the amount borne at the time of renting the network infrastructure.

Viz., it may be said that control of the number of the flow entries in accordance with the subject exemplary embodiment guarantees a flow table space available for each user (flow entry use ratio U) depending upon his/her cost bearing ratio.

Figure 5:
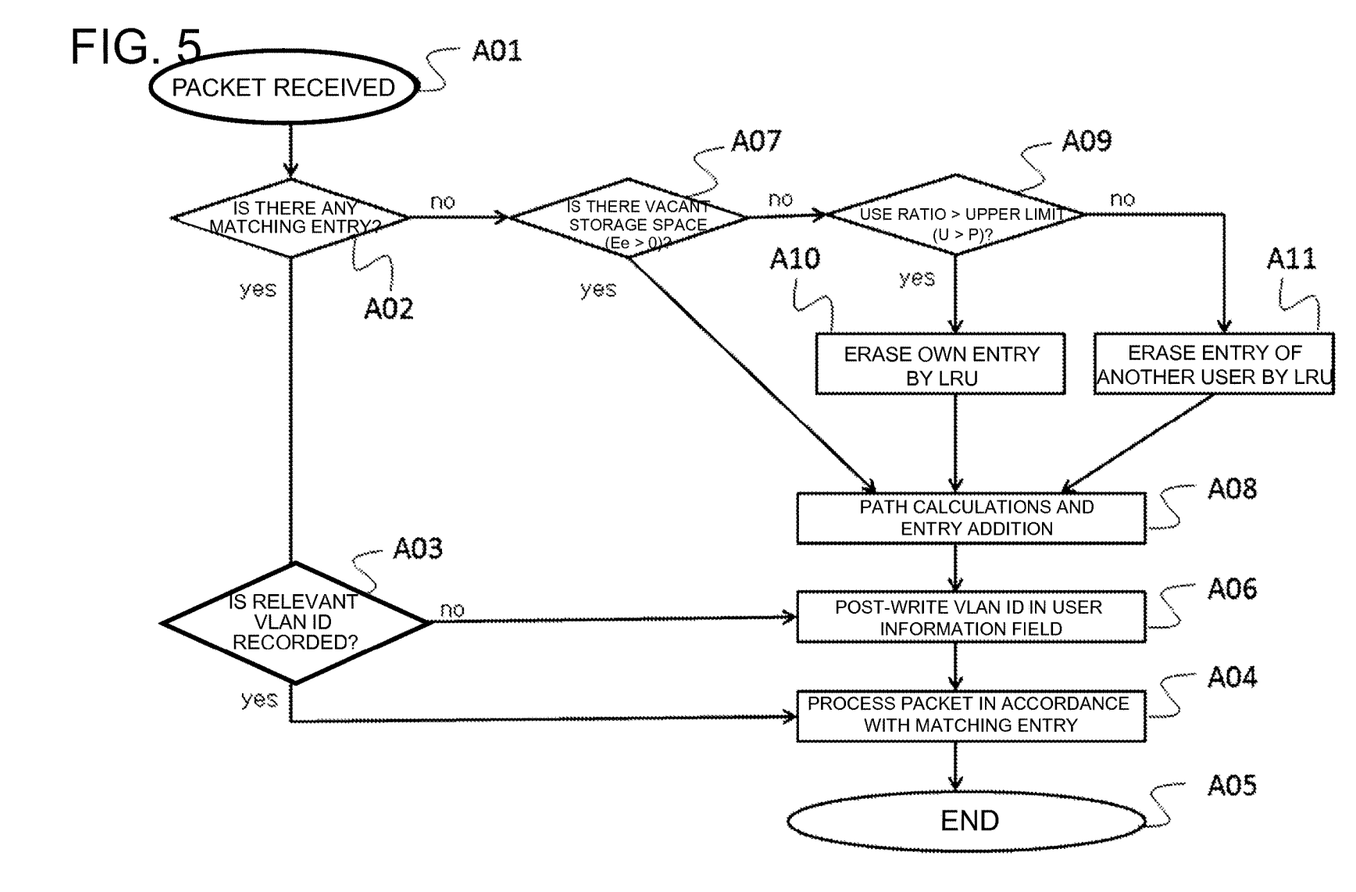
FIG. 5 is a flowchart showing the operation of a communication node according to the exemplary embodiment 1 of the present invention.

The operation of the subject exemplary embodiment will now be explained in detail with reference to the drawings. FIG. 5 depicts a flowchart showing the operation of a communication node according to an exemplary embodiment 1 of the present invention. Referring to FIG. 5, when a communication node 20 has received a packet, the communication node discriminates the VLAN ID of the port that has received the packet (step A01).

The communication node 20 then reads out the header information of the packet, and searches the entry memory 201 for a flow entry having match conditions matching the header information (step A02).

If, as a result of the above search, there should exist the flow entry having match conditions matching the packet's header information, the communication node 20 checks to see whether or not the same VLAN ID as that discriminated in the step A01 has been recorded in the user information field of the flow entry (step A03).

If, as a result of the above search, the relevant VLAN ID has already been recorded, the relevant flow entry has been set as a user of the received packet. The communication node 20 executes the processing as set in the instruction field of the flow entry (step A04).

If conversely the result of the check in the step A03 indicates that the relevant VLAN ID has not been recorded, the relevant flow entry has not been set for the user of the received packet. Hence, the communication node 20 post-writes the VLAN ID, discriminated in the step A01, in the user information field of the relevant flow entry (step A06). By so doing, the flow entry in question is thenceforth counted as the shared flow entry shown in FIG. 3. After the step A06, the communication node 20 carries out the processing as from the step A04 in the manner as described above.

If the result of the search in the step A02 indicates that there is no flow entry matching the header information of the packet, the communication node 20 has to request the control apparatus 10 to set a flow entry. However, before requesting the control apparatus 10 to set the flow entry, the communication node 20 checks to see whether or not there is any vacant storage space in the entry memory 201 (step A07).

If, as a result of the above check, there has been any vacant storage space in the entry memory 201, the new flow entry is to be set in this vacant storage space. The communication node 20 requests the control apparatus 10 to set the flow entry and registers the flow entry sent from the control apparatus 10 in the entry memory 201 (step A08). Thenceforth, post-write of the VLAN ID (step A06) and packet processing in accordance with the flow entry (step A04) are carried out in the same way as when the flow entry has been found.

If conversely the result of the check in the step A07 indicates that no vacant storage space has been found in the entry memory 201, it is necessary to remove one of the flow entries stored in the entry memory 201 to procure a vacant storage space.

The packet processor 202 thus requests the entry management section 203 to remove one entry as the packet processor specifies the VLAN ID discriminated in the step A01.

On receipt of the request, the entry management section 203 uses e.g., the above mentioned equations to calculate the flow entry use ratio U of the user bearing the VLAN ID discriminated in the step A01, and compares the so calculated use ratio to his/her cost bearing ratio (threshold value) P in the step A09.

It is now supposed that the result of the above comparison indicates that the flow entry use ratio U of the user, having the same VLAN ID as that at the port of receipt of the packet appropriated, surpasses his/her cost bearing ratio P (threshold value). In such case, the entry management section 203 removes one of the flow entries as selected by e.g., LRU from among the flow entries destined for the user (step A10). In short, if the user uses the storage space of the entry memory 201 in excess of the storage space tolerated by his/her cost bearing ratio, the flow entry recorded for use by him/her is subject to removal. Thenceforth, a request to the control apparatus 10 for setting the flow entry, registration of the flow entry in the entry memory 201 (step A08), post-write of the VLAN ID (step A06) and packet processing in accordance with the flow entry (step A04) are carried out in the same manner as set out above.

It is then supposed that, as the result of the above comparison, it has been found that the flow entry use ratio U of the user, having the same VLAN ID as that at the port of receipt of the packet appropriated, is less than the user's cost bearing ratio (threshold value) P. In such case, the entry management section 203 removes one flow entry as selected from among the flow entries destined for another user by e.g., the LRU (step A11). Thenceforth, a request to the control apparatus 10 for setting the flow entry, registration of the flow entry in the entry memory 201 (step A08), post-write of the VLAN ID (step A06) and packet processing in accordance with the flow entry (step A04) are carried out in the same manner as set out above.

By the way, if, in the above step A11, there are multiple other users, it is possible to calculate the flow entry use ratio U for each of these users and to remove the flow entry of such a user whose use ratio differs most significantly from his/her cost bearing ratio (threshold value) P.

According to the subject exemplary embodiment, the flow entries stored in the entry memory 201 of the communication node 20 may be managed so that the flow entries stored therein will not be biased to those of a particular user. It is thus possible to prevent such a situation in which the numbers of flow entries become unbalanced depending on the difference between the communication frequency of the server 30A and that of the server 30B in FIG. 1 resulting in deterioration of the TAT of either one of the servers (see FIG. 1).

Moreover, in the subject exemplary embodiment, the number of flow entries that can be set for each user may be controlled in keeping with the fee paid by him/her in using the network infrastructure, thus guaranteeing equity among the users. It is also possible for data center businesses to construct a charging system in keeping with the flow entry use ratio U in leasing out their network infrastructures.

In the above described exemplary embodiment, the flow entries are removed after the entry memory 201 has become depleted of the vacant storage space. However, if it becomes necessary to procure a storage space in which to set a flow entry for processing a packet from a new user or a control packet, it is also possible to exercise control for removing a flow entry or entries of a pre-existing user before the entry memory 201 is depleted of the vacant flow entry or entries. In such case, it is inspected e.g., in the step A07 of FIG. 5 whether or not there is the vacant storage space in the entry memory 201 of a size equivalent to a preset number or a preset proportion of the flow entries, and a decision is then made on whether or not to remove the flow entry or entries depending on the result of the inspection.

Exemplary Embodiment 2

An exemplary embodiment 2, which is more simplistic than the exemplary embodiment 1, described above, will be explained with reference to the drawings. In the subject exemplary embodiment, a devoted table is appropriated from one user (VLAN ID) to another. Since the subject exemplary embodiment is otherwise similar to the exemplary embodiment 1, the following description is centered on the point of difference from the exemplary embodiment 1.

Figure 6:
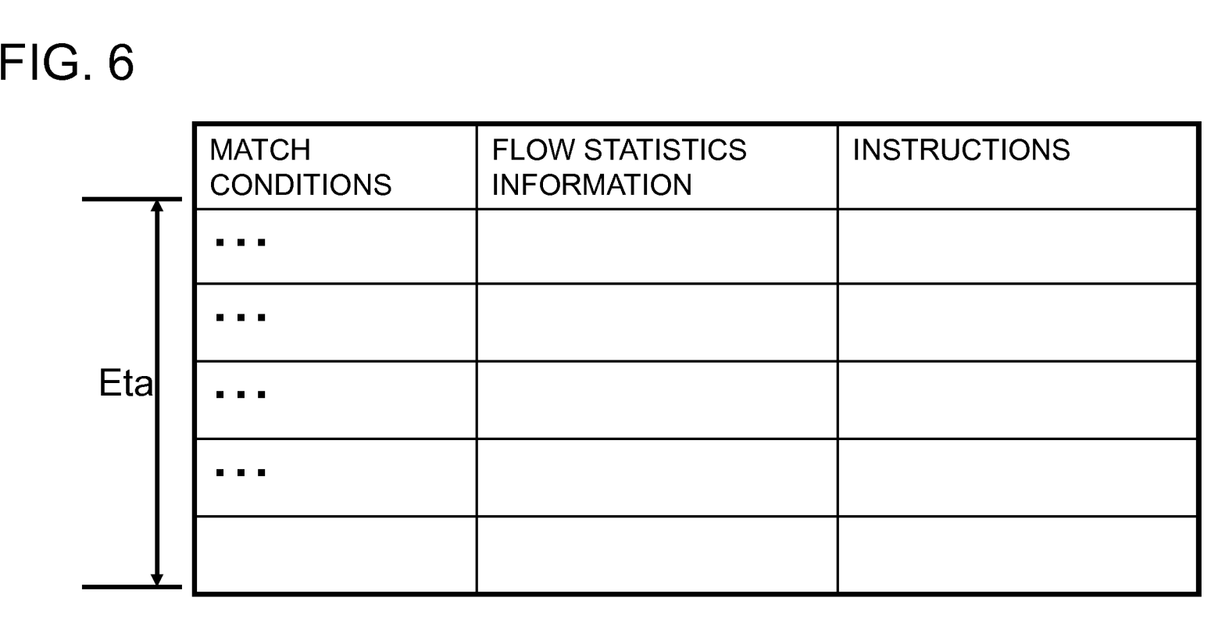
FIG. 6 is a tabulated view for illustrating a table stored in an entry memory of a communication node according to an exemplary embodiment 2 of the present invention.
Figure 7:
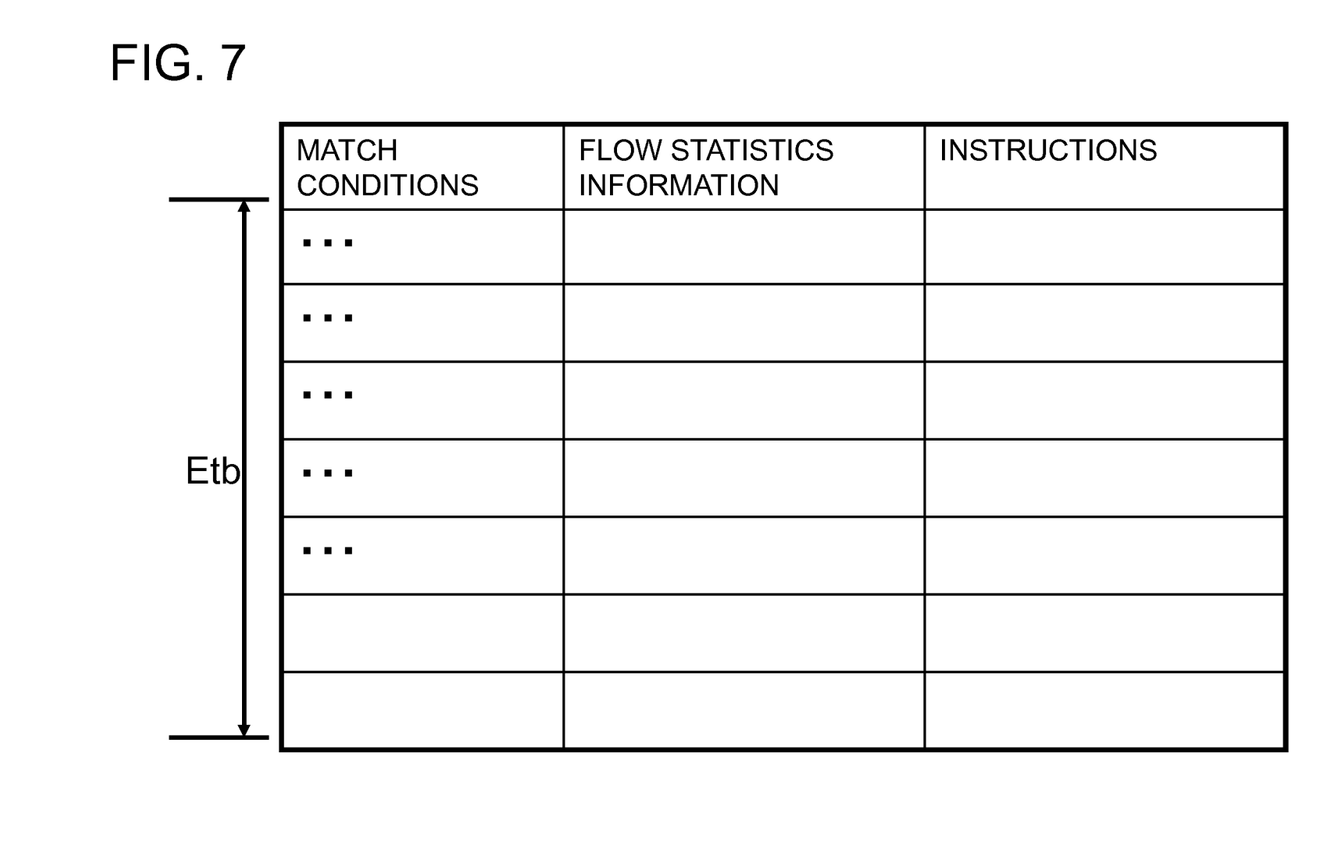
FIG. 7 is another tabulated view for illustrating the table stored in the entry memory of the communication node according to the exemplary embodiment 2 of the present invention.

FIGS. 6 and 7 depict example tables set in the entry memory of the communication node 20 of the subject exemplary embodiment. FIG. 6 shows a table appropriated to the user A. The total number Eta of the flow entries that can be stored in the table of the user A of FIG. 6 can be calculated by Eta=Et×Pa, where Et is the total number of the flow entries that can be stored in the entry memory of the communication node 20 and the Pa the above mentioned cost bearing ratio. In similar manner, FIG. 7 denotes a table appropriated to the user B.

According to the subject exemplary embodiment, the number of the flow entries corresponding to the cost bearing ratio can be appropriated without it being necessary to calculate the flow entry use ratio.

Exemplary Embodiment 3

Figure 8:
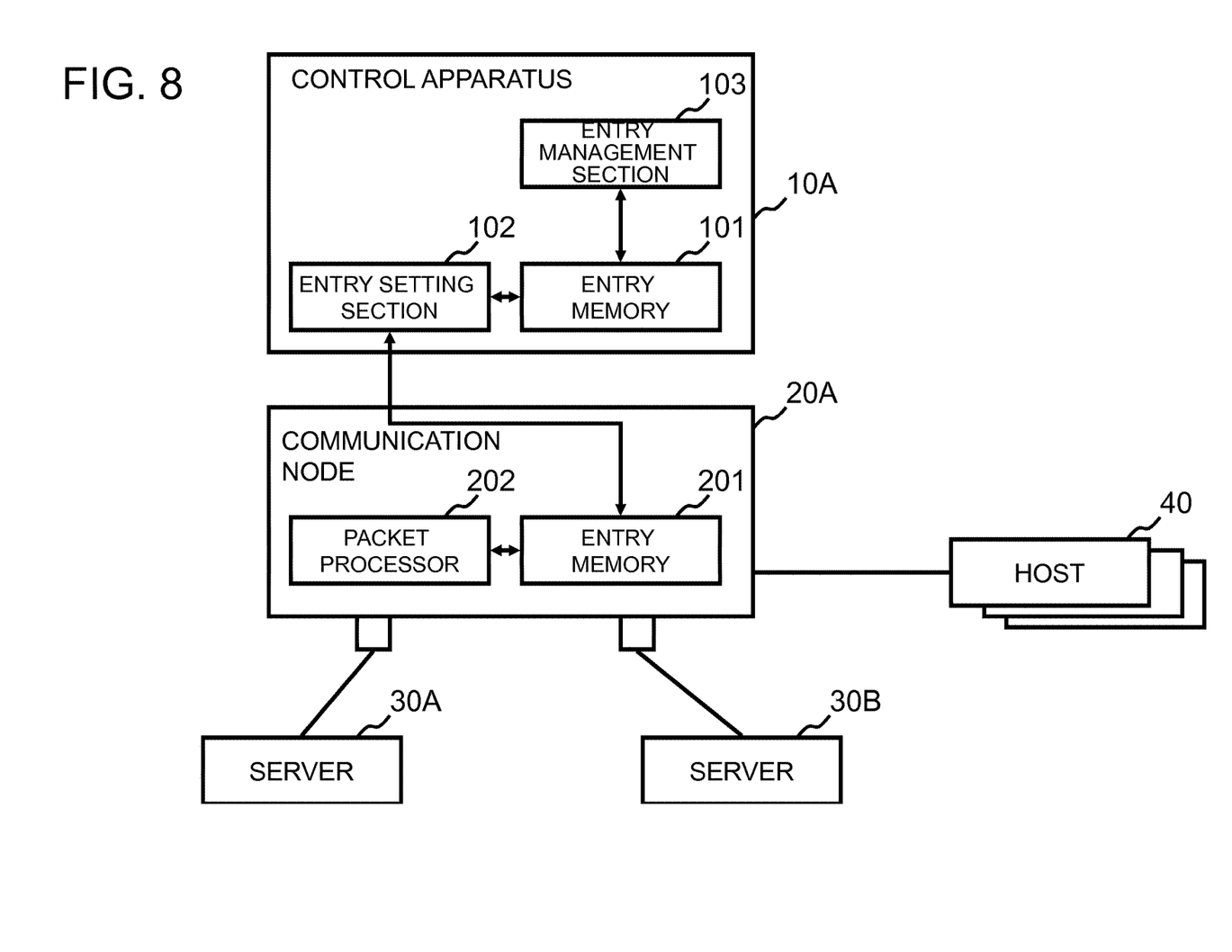
FIG. 8 is a block diagram showing a configuration of an exemplary embodiment 3 according to the present invention.

An exemplary embodiment 3, in which control of the number of flow entries per user may be exercised on the control apparatus side will now be described with reference to the drawings. Referring to FIG. 8, there is shown a configuration comprised of a control apparatus 10A, a communication node(s) 20A, servers 30A, 30B and a host(s) 40. The server(s) and the host(s) communicate with one another via the communication node(s) 20A.

The control apparatus 10A includes an entry memory 101, in which to store flow entries as set in the communication nodes 20A, and an entry setting section 102 that sets the flow entry in the entry memory 201 of the communication nodes 20A in response to a flow entry setting request from the communication nodes 20A. The control apparatus also includes an entry management section 103 that, like the entry management section 203 of the exemplary embodiment 1, controls the number of the flow entries from user to user.

In the subject exemplary embodiment, when the control apparatus 10A has received a request for setting the flow entry from the communication nodes 20A, the control apparatus references the entry memory 101 to check to see whether or not there is any vacant storage space in the entry memory 201 of the communication nodes 20A. It is now supposed that there is no vacant storage space. If, in such case, the proportion of the number of flow entries of a user (VLAN ID) to the total number of the flow entries storable in the entry memory 201 of the communication nodes 20A (use ratio) surpasses the cost bearing ratio (threshold value) for the user, the flow entry of such user is removed in precedence, as in the exemplary embodiment 1 described above. The control apparatus 10A sets the flow entry, prepared in response to the flow entry setting request from the communication node 20A, in the vacant storage space created by the removal.

As described above, the present invention can be configured for exercising control not only from the communication node side but also from the control apparatus side. In addition, the present invention may be adapted for a configuration in which the communication node has a plurality of tables, as in the above described exemplary embodiment 2. In such configuration, the control apparatus 10A references the respective tables to restrict the number of the flow entries from one user to another.

It is noted that the entry management sections 103, 203, mounted on the node or the control apparatus, as shown in FIGS. 1 and 8, can be implemented by a computer program that causes a computer on board the node or the control apparatus to carry out the functions of the entry management sections 103, 203 with the aid of the computer hardware.

It should be noted that, although preferred exemplary embodiments of the present invention are described above, the present invention is not to be restricted to these particular modes, such that further changes, substitutions or adjustments may be made within the range not departing from the basic technical concept of the invention. For example, there is no limitation to the configuration of the networks or to the number of the elements in the above described exemplary embodiments.

For example, in each of the above described exemplary embodiments, the sole communication node 20 or 20A is used. However, a plurality of the communication nodes 20 or 20A may also be used. On the other hand, in each of the above described exemplary embodiments, the users A and B share the network. Alternatively, three or more users may also share the network.

The proportion of the flow entries (flow entry use ratio) or the cost bearing ratio (threshold value) explained in the above exemplary embodiments may be modified in many different ways. For example, taking into consideration the fact that the shared flow entries are control flow entries in many cases, these shared flow entries may not be used as the basis for calculation of the flow entry proportion (use ratio). From the similar perspective, the shared flow entries may be exempted from the subject of removal.

Ultimately, certain preferred modes of the present invention will be summarized.

[Mode 1]
(Reference is made to the communication node according to the first aspect).

[Mode 2]
The communication node according to mode 1, wherein, the entry management section exercises control so that an entry use ratio of a user, calculated in a preset manner from at least the number of entries storable in the entry memory and the number of entries for the user will not surpass a user-based threshold value as set for the user.

[Mode 3]
The communication node according to mode 2, wherein, as long as there is a vacant storage space of the entry memory equivalent to a preset number of control information entries, the entry management section does not perform the threshold-value-based control information entry removal; and wherein, the entry management section commences the threshold-value-based entry control only after the vacant storage space in the entry memory has become unable to store the preset number of control information entries.

[Mode 4]
The communication node according to mode 2 or 3, wherein, the threshold value is set on the basis of the fee each user pays for using the network.

[Mode 5]
The communication node according to mode 1, wherein, a table for storage of the control information entries is readied in the entry memory from user to user; and wherein, the entry management section controls the number of the control information entries of each user using the table in place of controlling the entries using the threshold value.

[Mode 6]
The communication node according to mode 5, wherein, the number of the control information entries storable in each table is set on the basis of the fee each user pays for using the network.

[Mode 7]
The communication node according to any one of modes 1 to 6, wherein, the VLAN (Virtual Local Area Network) information is set in each of ports connected to entities of different users; and wherein, user discrimination is made on the basis of the VLAN information as set in the port where the packet that triggered setting the control information entry has been received.

[Mode 8]
(Reference is made to the control apparatus according to the second aspect).

[Mode 9]
(Reference is made to the method for managing control information entries according to the third aspect).

[Mode 10]
(Reference is made to the program according to the fourth aspect).

It is noted that, like the mode 1, the modes 8 to 10 may be expanded to the modes 2 to 7.

The disclosures of the above mentioned Patent Literatures as well as Non-Patent Literatures are to be incorporated herein by reference. The exemplary embodiments or examples may be modified or adjusted within the concept of the total disclosures of the present invention, inclusive of claims, based on the fundamental technical concept of the invention. A wide variety of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

REFERENCE SIGNS LIST 10, 10A control apparatus
20, 20A communication nodes
30A, 30B servers
40 host
101, 201 entry memories
102 entry setting section
103, 203 entry management sections
202 packet processor
204, 205 ports

What is claimed is:
1. A communication node comprising:
an entry memory configured to store a preset number of control information entries, each stipulating a processing applied to a packet received, in association with user information of one or more users;
a packet processor that references the entry memory to process the packet received; and
an entry management controller that controls a number of control information entries for a user, among the one or more users, so that, on a basis of a preset reference, the number of the control information entries for the user, stored in the entry memory, will not exceed a preset proportion thereof to the number of the control information entries storable in the entry memory,
wherein the entry management controller controls the number of control information entries for the user, so that an entry use ratio of the user, calculated in a preset manner from at least the number of control information entries storable in the entry memory and the number of control information entries for the user, will not exceed a user-based threshold value set for the user,
wherein the entry management controller does not perform a control information entry removal based on the user-based threshold value, when there is a vacant storage space of the entry memory equivalent to a preset number of control information entries, and
wherein the entry management controller commences the control information entry removal based on the user- based threshold value only after the vacant storage space in the entry memory has become unable to store the preset number of control information entries.

2. The communication node according to claim 1, wherein the user based threshold value is set on a basis of a fee each user pays for using a network.

3. The communication node according to claim 2, wherein
a Virtual Local Area Network (VLAN) information is set in each of ports connecting to entities of different users; and wherein,
user discrimination is made on the basis of the VLAN information as set in the port where the packet that triggered setting the control information entry has been received.

4. The communication node according to claim 1, wherein
a table for storage of the control information entries is readied in the entry memory for each of the one or more users; and wherein,
the entry management controller controls a number of the control information entries of each user using the table in place of controlling the entries using the threshold value.

5. The communication node according to claim 4, wherein
a Virtual Local Area Network (VLAN) information is set in each of ports connecting to entities of different users; and wherein,
user discrimination is made on the basis of the VLAN information as set in the port where the packet that triggered setting the control information entry has been received.

6. The communication node according to claim 4, wherein
the number of the control information entries storable in each table is set on the basis of a fee each user pays for using a network.

7. The communication node according to claim 6, wherein
a Virtual Local Area Network (VLAN) information is set in each of ports connecting to entities of different users; and wherein,
user discrimination is made on the basis of the VLAN information as set in the port where the packet that triggered setting the control information entry has been received.

8. The communication node according to claim 1, wherein
a Virtual Local Area Network (VLAN) information is set in each of ports connecting to entities of different users; and wherein,
user discrimination is made on the basis of the VLAN information as set in the port where the packet that triggered setting the control information entry has been received.

9. A control apparatus comprising:
at least one processor configured to execute:
an entry setting section that sets a control information entry or entries, stipulating a processing to be applied to a packet received, in response to a request from a communication node configured to store a preset number of the control information entries;
an entry management section that manages the control information entry or entries as set each of one or more users; and
a control section that controls the entry setting section so that, on a basis of a preset reference, a number of the control information entries for a user, stored in an entry memory of the communication node, will not exceed a preset proportion thereof to the number of the control information entries storable in the entry,
wherein the control section controls the number of the control information entries for the user, so that an entry use ratio of the user, calculated in a preset manner from at least the number of control information entries storable in the entry memory and the number of the control information entries for the user, will not exceed a user-based threshold value set for the user,
wherein the entry management section does not perform a control information entry removal based on the user-based threshold value, when there is a vacant storage space of the entry memory equivalent to a preset number of control information entries, and
wherein the entry management section commences control information entry removal based on the user-based threshold value only after the vacant storage space in the entry memory has become unable to store the preset number of control information entries.

10. The control apparatus according to claim 9, wherein
the entry management section exercises control so that an entry use ratio of a user, calculated in a preset manner from at least the number of entries storable by the entry memory and the number of entries for the user, will not exceed a threshold value as set for the user.

11. The control apparatus according to claim 9, wherein
the user based threshold value is set on a basis of a fee each user pays for using a network.

12. The control apparatus according to claim 9, wherein
a Virtual Local Area Network (VLAN) information is set in each of ports connecting to entities of different users; and wherein,
user discrimination is made on the basis of the VLAN information as set in the port where the packet that triggered setting the control information entry has been received.

13. A method for management of a control information entry or entries comprising:
checking to see whether or not a proportion of a number of a control information entries for a user to a number of the control information entries storable in an entry memory of a communication node exceeds a preset value, and
removing the entry or entries of the user from the entry memory in case the proportion exceeds the preset value,
wherein the number of control information entries for the user is controlled, so that an entry use ratio of the user, calculated in a preset manner from t least the number of control information entries storable in the entry memory and the number of control formation entries for the user, will not exceed a user-based threshold value set for the user,
wherein, a control information entry removal based on the user-based threshold a not performed, when there is a vacant storage space of the entry memory equivalent to a preset number of control information entries, and
wherein, the control information entry removal based on the user-based threshold value is commenced only after the vacant storage space in the entry memory has become unable to store the preset number of control formation entries.

14. The method according to claim 13, wherein
a Virtual Local Area Network (VLAN) information is set in each of ports connecting to entities of different users; and wherein, user discrimination is made on the basis of the VLAN information as set in the port where a packet that triggered setting the control information entry has been received.

15. A non-transitory computer-readable recording medium storing thereon a program for causing a computer on board a communication node to execute a process, comprising:
checking to see whether or not a proportion of a number of a control information entries for a user to a number of control information entries storable in an entry memory of a communication node exceeds a preset value, and
removing the entry or entries of the user from the entry memory in case the proportion exceeds the preset value,
wherein the number of control information entries for the user is controlled, so that an entry use ratio of the user, calculated in a preset manner from at least the number of control information entries storable in the entry memory and the number of control information entries for the user, will not exceed a user-based threshold value set for the user,
wherein, a control information entry removal based on the user-based threshold value is not performed, when there is a vacant storage space of the entry memory equivalent to a preset number of control information entries, and
wherein, the control information entry removal based on the user-based threshold value is commenced only after the vacant storage space in the entry memory has become unable to store the preset number of control information entries.

16. A non-transitory computer-readable recording medium storing thereon a program for causing a computer on board a control apparatus controlling a communication node to execute a process, comprising:
referencing an entry memory of the control apparatus managing control information entries stored in an entry memory of the communication node to check to see whether or not a proportion of a number of control information entries for a user exceeds a preset value; and
instructing the communication node to remove an entry or entries for the one user from the entry memory of the communication node if the proportion exceeds the preset value,
wherein the number of control information entries for the user is controlled, so that an entry use ratio of the user, calculated in a preset manner from at least the number of control information entries storable in the entry memory and the number of control information for the user, will not exceed a user-based threshold value set for the user,
wherein, a control information entry removal based on the user-based threshold a not performed, when there is a vacant storage space of the entry memory equivalent to a preset number of control information entries, and
wherein, the control information entry removal based on the user-based threshold value is commenced only after the vacant storage space in the entry memory has become unable to store the preset number of control information entries.

* * * * *